(12) United States Patent
Lee et al.

(10) Patent No.: US 8,927,628 B2
(45) Date of Patent: Jan. 6, 2015

(54) METHOD FOR FABRICATING ENERGY PLASTIC MASTERBATCH AND PLASTIC PRODUCT DERIVED THEREFROM

(75) Inventors: Kwok Sing Lee, Guangdong (CN); Wenji Xu, Guangdong (CN)

(73) Assignee: South China Reborn Resources (Zhongshan) Co., Ltd., ZhongShan (CN)

( * ) Notice: Subject to any disclaimer, the term of this patent is extended or adjusted under 35 U.S.C. 154(b) by 206 days.

(21) Appl. No.: 13/581,540

(22) PCT Filed: Jul. 29, 2010

(86) PCT No.: PCT/CN2010/075549
§ 371 (c)(1),
(2), (4) Date: Aug. 28, 2012

(87) PCT Pub. No.: WO2011/134209
PCT Pub. Date: Nov. 3, 2011

(65) Prior Publication Data
US 2012/0322914 A1   Dec. 20, 2012

(30) Foreign Application Priority Data
Apr. 26, 2010 (CN) .......................... 2010 1 0154643

(51) Int. Cl.
*C08J 3/22* (2006.01)
*C08K 3/22* (2006.01)
*C08K 3/38* (2006.01)
*C08K 9/02* (2006.01)

(52) U.S. Cl.
CPC .............. *C08J 3/226* (2013.01); *C08J 2300/22* (2013.01); *C08K 3/22* (2013.01); *C08K 3/38* (2013.01); *C08K 9/02* (2013.01)
USPC ............ 523/351; 524/405; 524/433; 524/497

(58) Field of Classification Search
CPC .............. C08J 3/226; C08K 9/02; C08K 3/04; C08K 3/22; C08K 3/34; C08K 3/36; C08K 3/38
USPC .......................... 523/351; 524/405, 443, 497
See application file for complete search history.

(56) References Cited

FOREIGN PATENT DOCUMENTS

| | | |
|---|---|---|
| CN | 1478828 | 3/2004 |
| CN | 1683614 | 10/2005 |
| CN | 101148353 | 3/2008 |
| JP | 2001-192927 | 7/2001 |

OTHER PUBLICATIONS

International Search Report for International application No. PCT/CN2010/075549, dated Feb. 10, 2011 (6 pages).

*Primary Examiner* — Edward Cain
(74) *Attorney, Agent, or Firm* — Hamre, Schumann, Mueller & Larson, P.C.

(57) ABSTRACT

A method for fabricating energy plastic masterbatches and a plastic product containing energy plastic masterbatches fabricated by the method are provided. The fabrication method includes: oxidizing carbon black with ozone; fully mixing carbon black after treatment and a nano tourmaline powder to form a base; adding ultrafine rutile titanium dioxide to the base, and mixing fully, to form an energy raw material; drying the mixed energy raw material at 100-120° C. for 1-2 hours; adding a dispersant to the dried energy raw material, in which the dispersant is added in an amount of 2-4% of the total weight of the mixed base of carbon black and the nano tourmaline powder; adding a plastic carrier resin to the energy raw material added with the dispersant, and mixing uniformly, to form a mixed material, in which the plastic carrier resin is added in an amount of 12-18% of the total weight of the mixed base of carbon black and the nano tourmaline powder; and fabricating plastic masterbatches with the mixed material by a production apparatus.

14 Claims, 1 Drawing Sheet

METHOD FOR FABRICATING ENERGY PLASTIC MASTERBATCH AND PLASTIC PRODUCT DERIVED THEREFROM

BACKGROUND OF THE INVENTION

1. Field of Invention

The present invention relates to a method for fabricating plastic masterbatches and a plastic product, and particularly to a method for fabricating energy plastic masterbatches and a plastic product containing plastic masterbatches fabricated by the method.

2. Related Art

With the continuous development of chemistry and chemical technology, chemical products have been more and more widely used in people's lives. As a commonly used chemical product, plastic has become an indispensable part in daily life. Due to the development of the plastic technology, the plastic products have more and more enriched types, various performances, and continuously improved functional characteristics. In the past years, by utilizing the characteristics of tourmaline, various plastic health products are fabricated by immersing, spray coating, or directly blending tourmaline powder, and the products can increase the negative ion content of indoor air significantly, thus having health care effects on the human body. However, as tourmaline is a natural stone having a compact structure, the compatibility of tourmaline with plastic is poor, so that the plastic health products fabricated from tourmaline have disadvantages of poor washing resistance, undesirable tensile strength and bending strength, and poor tinting strength.

SUMMARY OF THE INVENTION

In view of the disadvantages of the plastic health products fabricated from tourmaline in the prior art, the present invention is directed to a method for fabricating energy plastic masterbatches, which can significantly improve the performances of the products.

Meanwhile, the present invention is further directed to a product derived from the energy plastic masterbatches.

The technical solutions employed by the present invention to solve the technical problems include a method for fabricating energy plastic masterbatches, which includes:

A. oxidizing carbon black with ozone;

B. fully mixing carbon black after treatment and a nano tourmaline powder to form a base, in which the nano tourmaline powder accounts for 80%-85% of the total weight of the base, and carbon black accounts for 15%-20% of the total weight of the base; and adding ultrafine rutile titanium dioxide to the base, and mixing fully, to form an energy raw material, in which the content of ultrafine rutile titanium dioxide is 10-15% of the total weight of the mixed base of carbon black and the nano tourmaline powder;

C. drying the mixed energy raw material at 100-120° C. for 1-2 hours;

D. adding a dispersant to the dried energy raw material, in which the dispersant is added in an amount of 2-4% of the total weight of the mixed base of carbon black and the nano tourmaline powder;

E. adding a plastic carrier resin to the energy raw material added with the dispersant, and mixing uniformly, to form a mixed material, in which the plastic carrier resin is added in an amount of 12-18% of the total weight of the mixed base of carbon black and the nano tourmaline powder; and F. fabricating plastic masterbatches with the mixed material by a production apparatus.

The technical solutions employed by the present invention to solve the technical problems further include:

replacing carbon black with white carbon black, and optionally oxidizing white carbon black with ozone, where white carbon black is used.

After Step E, Step E1 of adding a coupling agent to the mixed material added with the plastic carrier resin and mixing uniformly may be included, in which the coupling agent is added in an amount of 1-4% of the total weight of the mixed base of carbon black and the nano tourmaline powder.

The plastic carrier resin is PVC, PE, EVA, PEVA, PET, LDPE, LLOPE, or GPPS.

Carbon black in Step A is ultrafine carbon black having a particle size of 1 μm or less; and white carbon black is ultrafine white carbon black having a particle size of 1 μm or less.

Ultrafine rutile titanium dioxide in Step B is ultrafine rutile titanium dioxide having a particle size of 1 μm or less.

The coupling agent is an aminosilane coupling agent.

The dispersant is magnesium stearate.

In the base, carbon black or white carbon black preferably accounts for 18% of the total weight of the base, and the nano tourmaline powder accounts for 82% of the total weight of the base.

The mixed energy raw material is preferably dried at 110° C. for 1.5 hours.

The plastic carrier resin is added in an amount of 15% of the total weight of the mixed base of carbon black and the nano tourmaline powder.

The weight of the dispersant is 3% of the total weight of the mixed base.

A plastic product containing energy plastic masterbatches fabricated by the fabrication method is provided.

The plastic product includes tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The present invention has the following beneficial effects. The present invention can fully and rationally utilize and exert the advantages and complementary effects of the functional materials such as carbon black (white carbon black), tourmaline, and titanium dioxide, thus eliminating the disadvantages of the plastic products fabricated by a single functional material, and making the functional plastic more desirable. The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS to produce functional plastic products, and the plastics may be fabricated into plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor, such that the plastic products have the advantages of carbon black (white carbon black), tourmaline, and titanium dioxide.

Hereinafter, the present invention is further described with reference to the following drawings and embodiments.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The embodiments are preferred implementations of the present invention, other embodiments having the same or similar principle and basic structure will fall in the protection scope of the present invention.

Figure 1:
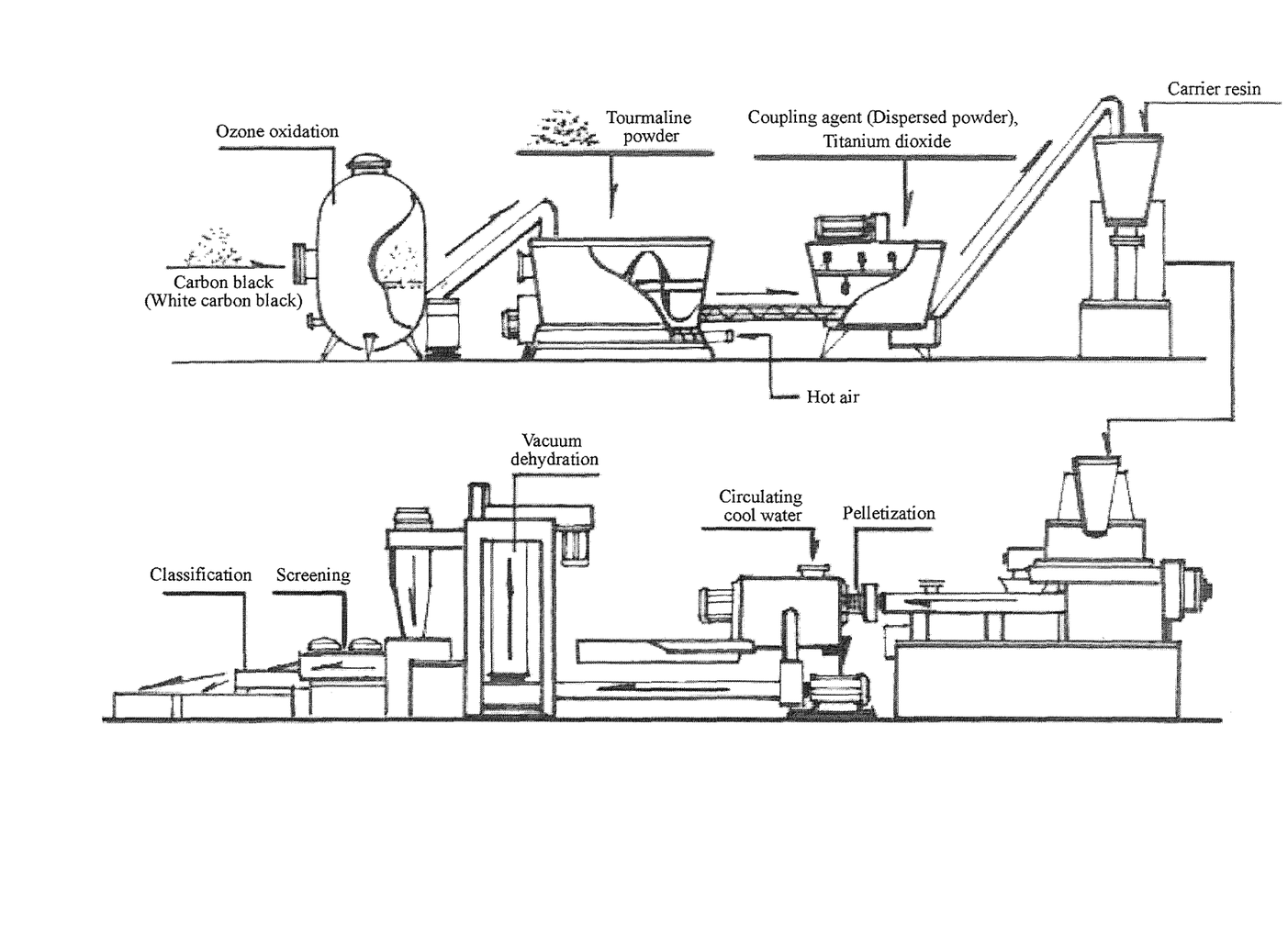
FIG. 1 is a production process flow chart of the present invention.

The present invention provides a method for fabricating energy plastic masterbatches, which mainly includes:

A. oxidizing carbon black with ozone, where in this embodiment, carbon black is ultrafine carbon black having a particle size of 1 μm or less, and is normally oxidized with ozone by an ozone oxidation carbon black apparatus in the prior art, to increase the internal surface area of carbon black by four times or higher, so as to enhance the absorption capacity of carbon black;

B. fully mixing carbon black after treatment and a nano tourmaline powder to form a base, in which carbon black accounts for 15-20% of the total weight of the base, and the nano tourmaline powder accounts for 80-85% of the total weight of the base (the mixing ratio of carbon black to the nano tourmaline powder depends on the use of the product to be produced), and adding ultrafine rutile titanium dioxide to the mixed base, and mixing fully, to form an energy raw material, in which the content of ultrafine rutile titanium dioxide is 10-15% of the total weight of the mixed base of carbon black and the nano tourmaline powder, and ultrafine rutile titanium dioxide has a particle size of 1 μm or less;

C. drying the mixed energy raw material at 100-120° C. for 1-2 hours (the drying duration is determined by checking whether the mixed energy raw material is completely dried);

D. adding a dispersant to the dried energy raw material, in which the dispersant is a basic resin related coupling agent, especially a coupling agent that can be easily mixed with a carrier resin, and the dispersant is added in an amount of 2-4% of the total weight of the mixed base; the dispersant may be magnesium stearate, and depending on the basic resin, may be a common dispersant in the prior art;

E. adding the plastic carrier resin to the energy raw material added with the dispersant, and mixing uniformly, to form a mixed material, in which the plastic carrier resin is added in an amount of 12-18% of the total weight of the mixed base of carbon black and the nano tourmaline powder, and the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, where in this embodiment, the coupling agent is an aminosilane coupling agent, and is added in an amount of 1-4% of the total weight of the mixed base of carbon black and the nano tourmaline powder; in specific implementation, the coupling agent may not be added to the mixed material, but is added in production of the plastic product with the plastic masterbatches; and F. blending the mixed material produced in Step E1, and fabricating plastic masterbatches through, for example, extrusion by an extruder, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

Carbon black in the present invention may also be optionally replaced by while carbon black (namely, silicon dioxide). Generally, as for transparent plastics or plastics of light colors, white carbon black is used, and as for opaque plastics or plastics of deep colors, carbon black is used. Hereinafter, the present invention is further described with several specific embodiments.

Embodiment 1

In this embodiment, a specific method for fabricating energy plastic masterbatches is provided, which mainly includes:

A. oxidizing carbon black with ozone, where in this embodiment, carbon black is ultrafine carbon black having a particle size of 1 μm or less, and is normally oxidized with ozone by an ozone oxidation carbon black apparatus in the prior art, to increase the internal surface area of carbon black by four times or higher, so as to enhance the absorption capacity of carbon black;

B. fully mixing carbon black after treatment and a nano tourmaline powder, to form a base, where in this embodiment, carbon black accounts for 15% of the total weight of the base, and the nano tourmaline powder accounts for 85% of the total weight of the base, and adding ultrafine rutile titanium dioxide to the mixed base, and mixing fully, to form an energy raw material, where in this embodiment, the content of ultrafine rutile titanium dioxide is 10% of the total weight of the mixed base of carbon black and the nano tourmaline powder, and in this embodiment, ultrafine rutile titanium dioxide has a particle size of 1 μm or less;

C. drying the mixed energy raw material at 100° C. for 1 hour;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 2%;

E. adding the plastic carrier resin to the energy raw material added with the dispersant, and mixing uniformly, to form a mixed material, where in this embodiment, the plastic carrier resin is added in an amount of 12% of the total weight of the mixed base of carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 1% of the total weight of the mixed base of carbon black and the nano tourmaline powder; in specific implementation, the coupling agent may not be added to the mixed material, but is added in production of the plastic product with the plastic masterbatches; and F. blending the mixed material produced in Step E1, and fabricating plastic masterbatches through, for example, extrusion by an extruder, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS to produce functional plastic products, such that the plastic products have the advantages of carbon black, tourmaline, and titanium dioxide.

Embodiment 2

In this embodiment, a specific method for fabricating energy plastic masterbatches is provided, which mainly includes:

A. oxidizing carbon black with ozone, where in this embodiment, carbon black is ultrafine carbon black having a particle size of 1 μm or less, and is normally oxidized with ozone by an ozone oxidation carbon black apparatus in the prior art, to increase the internal surface area of carbon black by four times or higher, so as to enhance the absorption capacity of carbon black;

B. fully mixing carbon black after treatment and a nano tourmaline powder, to form a base, where in this embodiment, carbon black accounts for 16% of the total weight of the base, and the nano tourmaline powder accounts for 84% of the total weight of the base, and adding ultrafine rutile titanium dioxide to the mixed base, and mixing fully, to form an energy raw material, where in this embodiment, the content of ultrafine rutile titanium dioxide is 11% of the total weight of the mixed base of carbon black and the nano tourmaline powder, and in this embodiment, ultrafine rutile titanium dioxide has a particle size of 1 μm or less;

C. drying the mixed energy raw material at 104° C. for 1.2 hours;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 2.4%;

E. adding the plastic carrier resin to the energy raw material added with the dispersant, and mixing uniformly, to form a mixed material, where in this embodiment, the plastic carrier resin is added in an amount of 13% of the total weight of the mixed base of carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 1.6% of the total weight of the mixed base of carbon black and the nano tourmaline powder; in specific implementation, the coupling agent may not be added to the mixed material, but is added in production of the plastic product with the plastic masterbatches; and F. blending the mixed material produced in Step E1, and fabricating plastic masterbatches through, for example, extrusion by an extruder, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS, to produce functional plastic products, such that the plastic products have the advantages of carbon black, tourmaline, and titanium dioxide.

Embodiment 3

In this embodiment, a specific method for fabricating energy plastic masterbatches is provided, which mainly includes:

A. oxidizing carbon black with ozone, where in this embodiment, carbon black is ultrafine carbon black having a particle size of 1 μm or less, and is normally oxidized with ozone by an ozone oxidation carbon black apparatus in the prior art, to increase the internal surface area of carbon black by four times or higher, so as to enhance the absorption capacity of carbon black;

B. fully mixing carbon black after treatment and a nano tourmaline powder, to form a base, where in this embodiment, carbon black accounts for 17% of the total weight of the base, and the nano tourmaline powder accounts for 83% of the total weight of the base, and adding ultrafine rutile titanium dioxide to the mixed base, and mixing fully, to form an energy raw material, where in this embodiment, the content of ultrafine rutile titanium dioxide is 12% of the total weight of the mixed base of carbon black and the nano tourmaline powder, and in this embodiment, ultrafine rutile titanium dioxide has a particle size of 1 μm or less;

C. drying the mixed energy raw material at 108° C. for 1.4 hours;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 2.8%;

E. adding the plastic carrier resin to the energy raw material added with the dispersant, and mixing uniformly, to form a mixed material, where in this embodiment, the plastic carrier resin is added in an amount of 14% of the total weight of the mixed base of carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 2.2% of the total weight of the mixed base of carbon black and the nano tourmaline powder; in specific implementation, the coupling agent may not be added to the mixed material, but is added in production of the plastic product with the plastic masterbatches; and F. blending the mixed material produced in Step E1, and fabricating plastic masterbatches through extrusion by an extruder, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS, to produce functional plastic products, such that the plastic products have the advantages of carbon black, tourmaline, and titanium dioxide.

Embodiment 4

In this embodiment, a specific method for fabricating energy plastic masterbatches is provided, which mainly includes:

A. oxidizing carbon black with ozone, where in this embodiment, carbon black is ultrafine carbon black having a particle size of 1 μm or less, and is normally oxidized with ozone by an ozone oxidation carbon black apparatus in the prior art, to increase the internal surface area of carbon black by four times or higher, so as to enhance the absorption capacity of carbon black;

B. fully mixing carbon black after treatment and a nano tourmaline powder, to form a base, where in this embodiment, carbon black accounts for 18% of the total weight of the base, and the nano tourmaline powder accounts for 82% of the total weight of the base, and adding ultrafine rutile titanium dioxide to the mixed base, and mixing fully, to form an energy raw material, where in this embodiment, the content of ultrafine rutile titanium dioxide is 12% of the total weight of the mixed base of carbon black and the nano tourmaline powder, and in this embodiment, ultrafine rutile titanium dioxide has a particle size of 1 μm or less;

C. drying the mixed energy raw material at 110° C. for 1.5 hours;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 3%;

E. adding the plastic carrier resin to the energy raw material added with the dispersant, and mixing uniformly, to form a mixed material, where in this embodiment, the plastic carrier resin is added in an amount of 15% of the total weight of the mixed base of carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 2.8% of the total weight of the mixed base of carbon black and the nano tourmaline powder; in specific implementation, the coupling agent may not be added to the mixed material, but is added in production of the plastic product with the plastic masterbatches; and F. blending the mixed material produced in Step E1, and fabricating plastic masterbatches through, for example, extrusion by an extruders, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS, to produce functional plastic products, such that the plastic products have the advantages of carbon black, tourmaline, and titanium dioxide.

Embodiment 5

In this embodiment, a specific method for fabricating energy plastic masterbatches is provided, which mainly includes:

A. oxidizing carbon black with ozone, where in this embodiment, carbon black is ultrafine carbon black having a particle size of 1 μm or less, and is normally oxidized with ozone by an ozone oxidation carbon black apparatus in the prior art, to increase the internal surface area of carbon black by four times or higher, so as to enhance the absorption capacity of carbon black;

B. fully mixing carbon black after treatment and a nano tourmaline powder, to form a base, where in this embodiment, carbon black accounts for 18% of the total weight of the base, and the nano tourmaline powder accounts for 82% of the total weight of the base, and adding ultrafine rutile titanium dioxide to the mixed base, and mixing fully, to form an energy raw material, where in this embodiment, the content of ultrafine rutile titanium dioxide is 13% of the total weight of the mixed base of carbon black and the nano tourmaline powder, and in this embodiment, ultrafine rutile titanium dioxide has a particle size of 1 μm or less;

C. drying the mixed energy raw material at 112° C. for 1.6 hours;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 3.6%;

E. adding the plastic carrier resin to the energy raw material added with the dispersant, and mixing uniformly, to form a mixed material, where in this embodiment, the plastic carrier resin is added in an amount of 16% of the total weight of the mixed base of carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 3% of the total weight of the mixed base of carbon black and the nano tourmaline powder; in specific implementation, the coupling agent may not be added to the mixed material, but is added in production of the plastic product with the plastic masterbatches; and F. blending the mixed material produced in Step E1, and fabricating plastic masterbatches through, for example, extrusion by an extruder, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per cm$^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS, to produce functional plastic products, such that the plastic products have the advantages of carbon black, tourmaline, and titanium dioxide.

Embodiment 6

In this embodiment, a specific method for fabricating energy plastic masterbatches is provided, which mainly includes:

A. oxidizing carbon black with ozone, where in this embodiment, carbon black is ultrafine carbon black having a particle size of 1 μm or less, and is normally oxidized with ozone by an ozone oxidation carbon black apparatus in the prior art, to increase the internal surface area of carbon black by four times or higher, so as to enhance the absorption capacity of carbon black;

B. fully mixing carbon black after treatment and a nano tourmaline powder, to form a base, where in this embodiment, carbon black accounts for 19% of the total weight of the base, and the nano tourmaline powder accounts for 81% of the total weight of the base, and adding ultrafine rutile titanium dioxide to the mixed base, and mixing fully, to form an energy raw material, where in this embodiment, the content of ultrafine rutile titanium dioxide is 14% of the total weight of the mixed base of carbon black and the nano tourmaline powder, and in this embodiment, ultrafine rutile titanium dioxide has a particle size of 1 μm or less;

C. drying the mixed energy raw material at 116° C. for 1.8 hours;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 3.6%;

E. adding the plastic carrier resin to the energy raw material added with the dispersant, and mixing uniformly, to form a mixed material, where in this embodiment, the plastic carrier resin is added in an amount of 17% of the total weight of the mixed base of carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 3.4% of the total weight of the mixed base of carbon black and the nano tourmaline powder; in specific implementation, the coupling agent may not be added to the mixed material, but is added in production of the plastic product with the plastic masterbatches; and F. blending the mixed material produced in Step E1, and fabricating plastic masterbatches through extrusion by an extruder, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per cm$^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS, to produce functional plastic products, such that the plastic products have the advantages of carbon black, tourmaline, and titanium dioxide.

Embodiment 7

In this embodiment, a specific method for fabricating energy plastic masterbatches is provided, which mainly includes:

A. oxidizing carbon black with ozone, where in this embodiment, carbon black is ultrafine carbon black having a particle size of 1 μm or less, and is normally oxidized with ozone by an ozone oxidation carbon black apparatus in the prior art, to increase the internal surface area of carbon black by four times or higher, so as to enhance the absorption capacity of carbon black;

B. fully mixing carbon black after treatment and a nano tourmaline powder, to form a base, where in this embodiment, carbon black accounts for 20% of the total weight of the base, and the nano tourmaline powder accounts for 80% of the total weight of the base, and adding ultrafine rutile titanium dioxide to the mixed base, and mixing fully, to form an energy raw material, where in this embodiment, the content of ultrafine rutile titanium dioxide is 15% of the total weight of the mixed base of carbon black and the nano tourmaline powder, and in this embodiment, ultrafine rutile titanium dioxide has a particle size of 1 μm or less;

C. drying the mixed energy raw material at 120° C. for 2 hours;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 4%;

E. adding the plastic carrier resin to the energy raw material added with the dispersant, and mixing uniformly, to form a mixed material, where in this embodiment, the plastic carrier resin is added in an amount of 18% of the total weight of the mixed base of carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 4% of the total weight of the mixed base of carbon black and the nano tourmaline powder; in specific implementation, the coupling agent may not be added to the mixed material, but is added in production of the plastic product with the plastic masterbatches; and F. blending the mixed material produced in Step E1, and fabricating a plastic masterbatches through, for example, extrusion by an extruder, and then a pelletization process, according to the characteristic blending performance of the plastic, where in this embodiment, the extrusion and pelletization process are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS, to produce functional plastic products, such that the plastic products have the advantages of carbon black, tourmaline, and titanium dioxide.

Embodiment 8

In this embodiment, a specific method for fabricating energy plastic masterbatches is provided, which mainly includes:

A. oxidizing white carbon black with ozone, where in this embodiment, white carbon black is ultrafine white carbon black having a particle size of 1 μm or less, and is normally oxidized with ozone by an ozone oxidation white carbon black apparatus in the prior art, so as to enhance the absorption capacity of white carbon black (white carbon black may not be oxidized with ozone).

B. fully mixing white carbon black after treatment and a nano tourmaline powder, to form a base, where in this embodiment, white carbon black accounts for 15% of the total weight of the base, and the nano tourmaline powder accounts for 85% of the total weight of the base, and adding ultrafine rutile titanium dioxide to the mixed base, and mixing fully, to form an energy raw material, where in this embodiment, the content of ultrafine rutile titanium dioxide is 10% of the total weight of the mixed base of white carbon black and the nano tourmaline powder, and in this embodiment, ultrafine rutile titanium dioxide has a particle size of 1 μm or less;

C. drying the mixed energy raw material at 100° C. for 1 hour;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 2%;

E. adding the plastic carrier resin to the energy raw material added with the dispersant, and mixing uniformly, to form a mixed material, where in this embodiment, the plastic carrier resin is added in an amount of 12% of the total weight of the mixed base of white carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 1% of the total weight of the mixed base of white carbon black and the nano tourmaline powder; in specific implementation, the coupling agent may not be added to the mixed material, but is added in production of the plastic product with the plastic masterbatches; and F. blending the mixed material produced in Step E1, and fabricating plastic masterbatches through extrusion by an extruder, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS, to produce functional plastic products, such that the plastic products have the advantages of white carbon black, tourmaline, and titanium dioxide.

Embodiment 9

In this embodiment, a specific method for fabricating energy plastic masterbatches is provided, which mainly includes:

A. oxidizing white carbon black with ozone, where in this embodiment, white carbon black is ultrafine white carbon black having a particle size of 1 μm or less, and is normally oxidized with ozone by an ozone oxidation white carbon black apparatus in the prior art, so as to enhance the absorption capacity of white carbon black (white carbon black may not be oxidized with ozone).

B. fully mixing white carbon black after treatment and a nano tourmaline powder, to form a base, where in this embodiment, white carbon black accounts for 16% of the total weight of the base, and the nano tourmaline powder accounts for 84% of the total weight of the base, and adding ultrafine rutile titanium dioxide to the mixed base, and mixing fully, to form an energy raw material, where in this embodiment, the content of ultrafine rutile titanium dioxide is 11% of the total weight of the mixed base of white carbon black and the nano tourmaline powder, and in this embodiment, ultrafine rutile titanium dioxide has a particle size of 1 μm or less;

C. drying the mixed energy raw material at 104° C. for 1.2 hour;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 2.4%;

E. adding the plastic carrier resin to the energy raw material added with the dispersant, and mixing uniformly, to form a mixed material, where in this embodiment, the plastic carrier resin is added in an amount of 13% of the total weight of the mixed base of white carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 1.6% of the total weight of the mixed base of white carbon black and the nano tourmaline powder; in specific implementation, the coupling agent may not be added to the mixed material, but is added in production of the plastic product with the plastic masterbatches; and F. blending the mixed material produced in Step E1, and fabricating plastic masterbatches through, for example, extrusion by an extruder, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS to produce functional plastic products, such that the plastic products have the advantages of white carbon black, tourmaline, and titanium dioxide.

Embodiment 10

In this embodiment, a specific method for fabricating energy plastic masterbatches is provided, which mainly includes:

A. oxidizing white carbon black with ozone, where in this embodiment, white carbon black is ultrafine white carbon black having a particle size of 1 μm or less, and is normally oxidized with ozone by an ozone oxidation white carbon black apparatus in the prior art, so as to enhance the absorption capacity of white carbon black (white carbon black may not be oxidized with ozone).

B. fully mixing white carbon black after treatment and a nano tourmaline powder, to form a base, where in this embodiment, white carbon black accounts for 17% of the total weight of the base, and the nano tourmaline powder accounts for 83% of the total weight of the base, and adding ultrafine rutile titanium dioxide to the mixed base, and mixing fully, to form an energy raw material, where in this embodiment, the content of ultrafine rutile titanium dioxide is 12% of the total weight of the mixed base of white carbon black and the nano tourmaline powder, and in this embodiment, ultrafine rutile titanium dioxide has a particle size of 1 μm or less;

C. drying the mixed energy raw material at 108° C. for 1.4 hours;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 2.8%;

E. adding the plastic carrier resin to the energy raw material added with the dispersant, and mixing uniformly, to form a mixed material, where in this embodiment, the plastic carrier resin is added in an amount of 14% of the total weight of the mixed base of white carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 2.2% of the total weight of the mixed base of white carbon black and the nano tourmaline powder; in specific implementation, the coupling agent may not be added to the mixed material, but is added in production of the plastic product with the plastic masterbatches; and F. blending the mixed material produced in Step E1, and fabricating plastic masterbatches through, for example, extrusion by an extruder, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS to produce functional plastic products, such that the plastic products have the advantages of white carbon black, tourmaline, and titanium dioxide.

Embodiment 11

In this embodiment, a specific method for fabricating energy plastic masterbatches is provided, which mainly includes:

A. oxidizing white carbon black with ozone, where in this embodiment, white carbon black is ultrafine white carbon black having a particle size of 1 μm or less, and is normally oxidized with ozone by an ozone oxidation white carbon black apparatus in the prior art, so as to enhance the absorption capacity of white carbon black (white carbon black may not be oxidized with ozone).

B. fully mixing white carbon black after treatment and a nano tourmaline powder, to form a base, where in this embodiment, white carbon black accounts for 18% of the total weight of the base, and the nano tourmaline powder accounts for 82% of the total weight of the base, and adding ultrafine rutile titanium dioxide to the mixed base, and mixing fully, to form an energy raw material, where in this embodiment, the content of ultrafine rutile titanium dioxide is 12% of the total weight of the mixed base of white carbon black and the nano tourmaline powder, and in this embodiment, ultrafine rutile titanium dioxide has a particle size of 1 μm or less;

C. drying the mixed energy raw material at 110° C. for 1.5 hours;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 3%;

E. adding the plastic carrier resin to the energy raw material added with the dispersant, and mixing uniformly, to form a mixed material, where in this embodiment, the plastic carrier resin is added in an amount of 15% of the total weight of the mixed base of white carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 2.8% of the total weight of the mixed base of white carbon black and the nano tourmaline powder; in specific implementation, the coupling agent may not be added to the mixed material, but is added in production of the plastic product with the plastic masterbatches; and F. blending the mixed material produced in Step E1, and fabricating plastic masterbatches through, for example, extrusion by an extruder, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS to produce functional plastic products, such that the plastic products have the advantages of white carbon black, tourmaline, and titanium dioxide.

Embodiment 12

In this embodiment, a specific method for fabricating energy plastic masterbatches is provided, which mainly includes:

A. oxidizing white carbon black with ozone, where in this embodiment, white carbon black is ultrafine white carbon black having a particle size of 1 μm or less, and is normally oxidized with ozone by an ozone oxidation white carbon black apparatus in the prior art, so as to enhance the absorption capacity of white carbon black (white carbon black may not be oxidized with ozone).

B. fully mixing white carbon black after treatment and a nano tourmaline powder, to form a base, where in this embodiment, white carbon black accounts for 18% of the total weight of the base, and the nano tourmaline powder accounts for 82% of the total weight of the base, and adding ultrafine rutile titanium dioxide to the mixed base, and mixing fully, to form an energy raw material, where in this embodiment, the content of ultrafine rutile titanium dioxide is 13% of the total weight of the mixed base of white carbon black and the nano tourmaline powder, and in this embodiment, ultrafine rutile titanium dioxide has a particle size of 1 μm or less;

C. drying the mixed energy raw material at 112° C. for 1.6 hours;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 3.6%;

E. adding a plastic carrier resin to the energy raw material added with the dispersant, and mixing uniformly, to form a mixed material, where in this embodiment, the plastic carrier resin is added in an amount of 16% of the total weight of the mixed base of white carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 3% of the total weight of the mixed base of white carbon black and the nano tourmaline powder; in specific implementation, the coupling agent may not be added to the mixed material, but is added in production of the plastic product with the plastic masterbatches; and F. blending the mixed material produced in Step E1, and fabricating plastic masterbatches through, for example, extrusion by an extruder, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatch of the present invention may be mixed with the plastic carrier resins in the prior art such as PVC, PE, EVA, PEVA, PET, LOPE, PP, LLOPE, and GPAS to produce functional plastic products, such that the plastic products have the advantages of white carbon black, tourmaline, and titanium dioxide.

Embodiment 13

In this embodiment, a specific method for fabricating energy plastic masterbatches is provided, which mainly includes:

A. oxidizing white carbon black with ozone, where in this embodiment, white carbon black is ultrafine white carbon black having a particle size of 1 μm or less, and is normally oxidized with ozone by an ozone oxidation white carbon black apparatus in the prior art, so as to enhance the absorption capacity of white carbon black (white carbon black may not be oxidized with ozone).

B. fully mixing white carbon black after treatment and a nano tourmaline powder, to form a base, where in this embodiment, white carbon black accounts for 19% of the total weight of the base, and the nano tourmaline powder accounts for 81% of the total weight of the base, and adding ultrafine rutile titanium dioxide to the mixed base, and mixing fully, to form an energy raw material, where in this embodiment, the content of ultrafine rutile titanium dioxide is 14% of the total weight of the mixed base of white carbon black and the nano tourmaline powder, and in this embodiment, ultrafine rutile titanium dioxide has a particle size of 1 μm or less;

C. drying the mixed energy raw material at 116° C. for 1.8 hours;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 3.6%;

E. adding a plastic carrier resin to the energy raw material added with the dispersant, and mixing uniformly, to form a mixed material, where in this embodiment, the plastic carrier resin is added in an amount of 17% of the total weight of the mixed base of white carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 3.4% of the total weight of the mixed base of white carbon black and the nano tourmaline powder; in specific implementation, the coupling agent may not be added to the mixed material, but is added in production of the plastic product with the plastic masterbatches; and F. blending the mixed material produced in Step E1, and fabricating plastic masterbatches through, for example, extrusion by an extruder, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS to produce functional plastic products, such that the plastic products have the advantages of white carbon black, tourmaline, and titanium dioxide.

Embodiment 14

In this embodiment, a specific method for fabricating energy plastic masterbatches is provided, which mainly includes:

A. oxidizing white carbon black with ozone, where in this embodiment, white carbon black is ultrafine white carbon black having a particle size of 1 μm or less, and is normally oxidized with ozone by an ozone oxidation white carbon black apparatus in the prior art, so as to enhance the absorption capacity of white carbon black (white carbon black may not be oxidized with ozone).

B. fully mixing white carbon black after treatment and a nano tourmaline powder, to form a base, where in this embodiment, white carbon black accounts for 20% of the total weight of the base, and the nano tourmaline powder accounts for 80% of the total weight of the base, and adding ultrafine rutile titanium dioxide to the mixed base, and mixing fully, to form an energy raw material, where in this embodiment, the content of ultrafine rutile titanium dioxide is 15% of the total weight of the mixed base of white carbon black and the nano tourmaline powder, and in this embodiment, ultrafine rutile titanium dioxide has a particle size of 1 μm or less;

C. drying the mixed energy raw material at 120° C. for 2 hours;

D. adding a dispersant to the dried energy raw material, where in this embodiment, the dispersant is a basic resin related coupling agent, especially a coupling agent that can be easily mixed with a carrier resin, and in this embodiment, the dispersant is added in an amount of 4%;

E. adding the plastic carrier resin to the energy raw material added with the dispersant, and mixing uniformly, to form a mixed material, where in this embodiment, the plastic carrier resin is added in an amount of 18% of the total weight of the mixed base of white carbon black and the nano tourmaline powder, and in this embodiment, the plastic carrier resin may be PVC, PE, EVA, PEVA, PET, LDPE, LLOPE, or GPPS, depending on the specific application;

E1. adding a coupling agent to the mixed material added with the plastic carrier resin, and mixing uniformly, in which the coupling agent is added in an amount of 4% of the total weight of the mixed base of white carbon black and the nano tourmaline powder; in specific implementation, the coupling agent may not be added to the mixed material, but is added in production of the plastic product with the plastic masterbatches; and F. blending the mixed material produced in Step E1, and fabricating a plastic masterbatches through, for example, extrusion by an extruder, and then a pelletization process, according to the characteristic blending performance of the plastic, where in this embodiment, the extrusion and pelletization processes are common plastic extrusion and pelletization processes in the prior art.

The energy plastic masterbatches produced by the fabrication method can be widely used in the processing of plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor.

The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatch of the present invention may be mixed with the plastic carrier resins in the prior art such as PVC, PE, EVA, PEVA, PET, LOPE, PP, LLOPE, and GPAS to produce functional plastic products, such that the plastic products have the advantages of white carbon black, tourmaline, and titanium dioxide.

The specific values listed in the specific embodiments are intended to illustrate the present invention, and in specific implementation, the value parameters within the range listed in the present invention but not included in the specific values can be selected for production to achieve the same effect.

The present invention can fully and rationally utilize and exert the advantages and complementary effects of the functional materials such as carbon black (white carbon black), tourmaline, and titanium dioxide, thus eliminating the disadvantages of the plastic products fabricated by a single functional material, and making the functional plastic more desirable. The energy plastic masterbatches produced by the present invention is totally emissive in a normal direction in the infrared radiation wavelength range 4-16, and has a normal total emissivity of 0.86 or higher and an anion concentration of 12100 anions per $cm^3$ (according to test results of National Infrared and Industrial Electric Heating Product Quality Supervision and Inspection Center). The energy plastic masterbatches of the present invention may be mixed with the plastic carrier resins in the prior art such as PVC, PE, EVA, PEVA, PET, LOPE, PP, LLOPE, and GPAS to produce functional plastic products, and the plastics can be fabricated into plastic products such as tablecloth, shower curtains, coasters, placemats, polyester long fiber, polyester staple fiber, PVC pipes, PE pipes, PVC pipe fittings, PE pipe fittings, mats, PP plastic doors and windows, PE plastic doors and windows, PVC plastic doors and windows, PP plastic floor, and PE or PVC plastic floor, such that the plastic products have the advantages of carbon black (white carbon black), tourmaline, and titanium dioxide.

What is claimed is:

1. A method for fabricating energy plastic masterbatches, comprising:
    A. oxidizing carbon black with ozone;
    B. fully mixing carbon black after treatment and a nano tourmaline powder to form a base, wherein the nano tourmaline powder accounts for 80-85% of the total weight of the base, and carbon black accounts for 15-20% of the total weight of the base; and adding ultrafine rutile titanium dioxide to the base, and mixing fully, to form an energy raw material, wherein the content of ultrafine rutile titanium dioxide is 10-15% of the total weight of the mixed base of carbon black and the nano tourmaline powder;
    C. drying the mixed energy raw material at 100-120° C. for 1-2 hours;
    D. adding a dispersant to the dried energy raw material, wherein the dispersant is added in an amount of 2-4% of the total weight of the mixed base of carbon black and the nano tourmaline powder;
    E. adding a plastic carrier resin to the energy raw material added with the dispersant, and mixing uniformly, to form a mixed material, wherein the plastic carrier resin is added in an amount of 12-18% of the total weight of the mixed base of carbon black and the nano tourmaline powder; and
    F. fabricating plastic masterbatches with the mixed material by a production apparatus.

2. The method for fabricating energy plastic masterbatches according to claim 1, wherein carbon black is replaced with white carbon black, and white carbon black is optionally oxidized with ozone where white carbon black is used.

3. The method for fabricating energy plastic masterbatches according to claim 1, wherein after Step E, the method further comprises Step E1 of adding a coupling agent to the mixed material added with the plastic carrier resin and mixing uniformly, wherein the coupling agent is added in an amount of 1-4% of the total weight of the mixed base of carbon black and the nano tourmaline powder.

4. The method for fabricating energy plastic masterbatches according to claim 1, wherein the plastic carrier resin comprises PVC, PE, EVA, PEVA, PET, LDPE, LLOPE, or GPPS.

5. The method for fabricating energy plastic masterbatches according to claim 1, wherein carbon black in Step A is ultrafine carbon black having a particle size of 1 μm or less; and white carbon black is ultrafine white carbon black having a particle size of 1 μm or less.

6. The method for fabricating energy plastic masterbatches according to claim 1, wherein ultrafine rutile titanium dioxide in Step B has a particle size of 1 μm or less.

7. The method for fabricating energy plastic masterbatches according to claim 3, wherein the coupling agent is an aminosilane coupling agent.

8. The method for fabricating energy plastic masterbatches according to claim 1, wherein the dispersant is magnesium stearate.

9. A plastic product containing energy plastic masterbatches fabricated by the method according to claim 1.

10. The plastic product according to claim 9, comprising tablecloth, shower curtains, coasters, placemats, polyester long fiber, polyester staple fiber, PVC pipe fittings, PE pipes, PVC pipes, PE pipe fittings, mats, PP plastic doors and windows, PE plastic doors and windows, PVC plastic doors and windows, PP plastic floor, and PE or PVC plastic floor.

11. The method for fabricating energy plastic masterbatches according to claim 2, wherein after Step E, the method further comprises Step E1 of adding a coupling agent to the mixed material added with the plastic carrier resin and mixing uniformly, wherein the coupling agent is added in an amount of 1-4% of the total weight of the mixed base of carbon black and the nano tourmaline powder.

12. The method for fabricating energy plastic masterbatches according to claim 2, wherein the plastic carrier resin comprises PVC, PE, EVA, PEVA, PET, LDPE, LLOPE, or GPPS.

13. The method for fabricating energy plastic masterbatches according to claim 2, wherein carbon black in Step A is ultrafine carbon black having a particle size of 1 μm or less; and white carbon black is ultrafine white carbon black having a particle size of 1 μm or less.

14. The method for fabricating energy plastic masterbatches according to claim 2, wherein the dispersant is magnesium stearate.

* * * * *